United States Patent [19]

Vrijburg

[11] 4,366,885
[45] Jan. 4, 1983

[54] PROTECTIVE STRIP FOR A ROAD VEHICLE, AND A ROAD VEHICLE HAVING SUCH A STRIP

[75] Inventor: Hans G. Vrijburg, Heemskerk, Netherlands

[73] Assignee: Hoogovens Ijmuiden B.V., Ijmuiden, Netherlands

[21] Appl. No.: 187,823

[22] Filed: Sep. 16, 1980

Related U.S. Application Data

[63] Continuation of Ser. No. 1,858, Jan. 8, 1979, abandoned.

[30] Foreign Application Priority Data

Jan. 11, 1978 [NL] Netherlands .......................... 7800308

[51] Int. Cl.³ ........................... F16F 7/12; B60R 19/04
[52] U.S. Cl. ..................................... 188/377; 293/110; 293/121
[58] Field of Search ...................... 188/371, 376, 377; 293/107, 109, 110, 121, 122

[56] References Cited

U.S. PATENT DOCUMENTS

| 2,998,214 | 8/1961 | Peterman | 188/377 X |
| 3,494,607 | 2/1970 | Rusch | 267/116 |
| 3,764,174 | 10/1973 | Taninecz | 188/377 X |
| 3,880,454 | 4/1975 | Haberle et al. | 293/121 |
| 3,938,841 | 2/1976 | Glance et al. | |
| 4,018,466 | 4/1977 | Norlin | |
| 4,072,334 | 2/1978 | Seegmiller et al. | 293/110 |
| 4,106,804 | 8/1978 | Scrivo | 293/121 X |

FOREIGN PATENT DOCUMENTS

| 2341463 | 3/1974 | Fed. Rep. of Germany . |
| 2456416 | 6/1975 | Fed. Rep. of Germany . |
| 2626754 | 1/1977 | Fed. Rep. of Germany . |
| 2238341 | 2/1975 | France . |
| 2263132 | 10/1975 | France . |
| 1492752 | 11/1977 | United Kingdom . |

*Primary Examiner*—Duane A. Reger
*Attorney, Agent, or Firm*—Stevens, Davis, Miller & Mosher

[57] ABSTRACT

A protective strip or bumper for a road vehicle has an energy absorbing structure, partly formed of plastics material, mounted on a metal backing member. Within the plastics material body are a plurality of metal crushable elements which are plastically deformable in order to absorb energy when an impact occurs and which are also readily replaceable.

10 Claims, 3 Drawing Figures

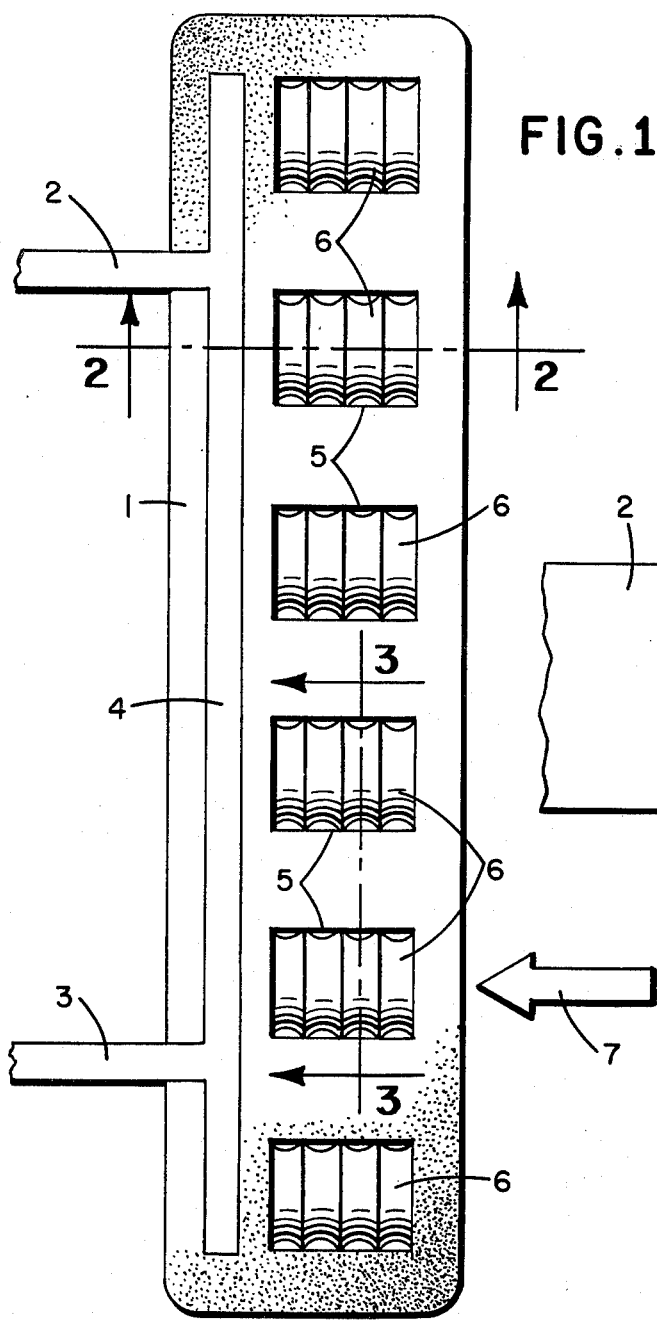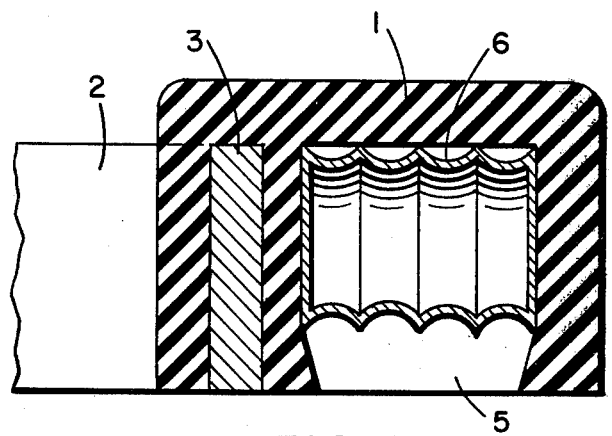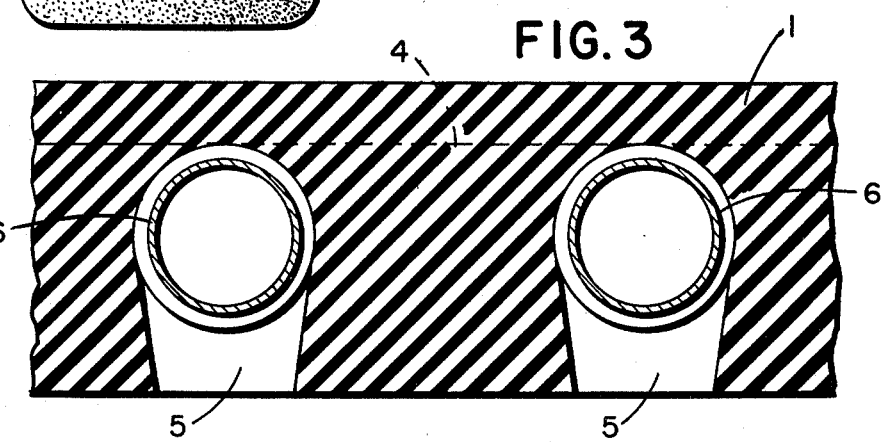

PROTECTIVE STRIP FOR A ROAD VEHICLE, AND A ROAD VEHICLE HAVING SUCH A STRIP

This is a continuation of application Ser. No. 1,858 filed Jan. 8, 1979, now abandoned.

BACKGROUND OF THE INVENTION

1. FIELD OF THE INVENTION

The invention relates to a protective strip for a motor car or other road vehicle. Such a strip, at least when applied to the front or rear of a road vehicle, is commonly called a bumper. The invention also relates to a motor car or other road vehicle equipped with such a protective strip, as well as to the crush elements for such a strip herein proposed.

2. DESCRIPTION OF THE PRIOR ART

The requirements set for modern motor cars increasingly include the provision of a protective strip which is able to absorb slight shocks without any severe or permanent resultant damage, and/or without fear of severe injuries to those within the motor car. In the first instance the front and rear bumpers of a motor car may come to mind in this regard, but it is possible to use the protective strip proposed according to the present invention around the entire circumference of the motor car.

When a motor car is mentioned in this description, it is always to be understood that the invention is applicable to say a road vehicle which may be subject to shocks and impacts and which is suitable to be equipped with a protective strip.

One form of known protective strip or bumper has a metal backing member adapted to be secured to the vehicle frame, and a shock-absorbing structure mounted on the metal backing member, so as to face outwardly therefrom. This shock-absorbing structure is at least partly formed of plastics material. It has been proposed to improve the shock-absorbing capacity of such a protective strip by suitable choice of the shape and the material of the plastics material structure. This may lead to particularly bulky and extremely expensive synthetic structures. It has also been proposed to make a shock-absorbing connection between the backing member and the frame of the motor car, for which purpose it is necessary to build expensive energy-destroying elements into this connection which also causes problems in practice.

U.S. Pat. No. 3,938,841 illustrates a bumper which is resilient and in which a plastics shell conceals one or more energy absorbing elements mounted on a backing member. The energy absorbing elements are made of elastomeric material of a relatively high durometer, and are apparently resilient in action.

French patent application No. 75 07026 (publication No. 2 263 132) shows a bumper having a solid body of elastomer or elastic foam projecting from a backing member and containing, embedded in it, a rigid profile in the form of for instance a tube or honeycomb. Energy is absorbed, when the bumper is compressed, by compression of an elastomeric element located between the profile and the backing member. This construction is relatively complex.

SUMMARY OF THE INVENTION

It is the object of this invention to provide a protective strip which has adequate shock-absorbing capacity and is safe in use, but which avoids complicated, bulky and expensive structures. In particular, the invention aims to provide shock-absorbing elements which are cheap and replaceable.

To this end, the invention consists in that the shock-absorbing structure in front of the backing element incorporates at least one metal crushable element which is shaped and arranged to undergo plastic deformation when compressed towards the backing element. By the term crushable element, there is meant an object which, under the impact of a force exerted on it, is deformed plastically in a controlled manner, so that the deformation work absorbs energy. The plastic deformation may be substantially non-resilient.

It has appeared that metal crushable elements suitable for the invention can be manufactured very simply and cheaply, and in addition can possess, within a restricted space, a considerably larger shock-absorption than plastics material structures. It is particularly preferred if the crushable elements are replaceably exchangeable. Due to the low cost of their manufacture, it is therefore justified and attractive to substitute new crushable elements for the deformed ones after an impact.

For some purposes it may be particularly advisable to design the crushable element in such a way that it has a progressive deformation characteristic. This means that, as the deformation of the crushable element progresses, an increasing reaction force is produced, so that the total deformation of the protective strip may remain limited. This progressive deformation characteristic can be achieved by the shape of the crushable element, in a manner similar to that in which a progressive spring characteristic is built into spring elements. It is also conceivable to achieve the progressive deformation characteristic by the combination of crushable elements which are deformed successively by one and the same impact.

It has appeared that a very simple and cheap crushable element can be obtained if it has the shape of a cylindrical hollow body having circumferential corrugations or folds in its wall. The shape of this may be somewhat like a beer can with a corrugated wall. It will be apparent that this shape can be obtained very simply by deep-drawing, or it may be made out of a tube. Besides, this form of crushable element is easy to fit and replace. The cylindrical crushable element can be open, so that its deformation characteristic is practically linear. It is, however, also preferred to form the cylindrical crushable element as a closed structure, which is at least partly filled with a gas and/or with solid foam. In this manner the crushable element functions at the same time as a crushable element and as an air spring, so that a deformation characteristic is obtained which is very beneficial to the absorption of impacts.

BRIEF DESCRIPTION OF THE DRAWINGS

FIG. 1 is a bottom plan view of the preferred embodiment of the invention;

FIG. 2 is a sectional view taken along line 2—2 of FIG. 1; and

FIG. 3 is a sectional view along line 3—3 of FIG. 1.

DESCRIPTION OF THE PREFERRED EMBODIMENT

In the illustrated protective strip or bumper according to the invention, there is shown a synthetic material structure 1 fixed to two rods 2 and 3 which in their turn are directly fixed to the chassis of a car. Mounted on the ends of rods 2 and 3 there is a steel supporting or backing element 4 which is clamped in a recess of the synthetic material structure 1 together with rods 2 and 3. In the synthetic material structure 1, a number of recesses 5 are provided, in which crushable elements 6 are located. As the recesses 5 are designed slightly narrower than the dimensions of crushable elements 6, and also taper somewhat towards their open or bottom side (in the manner of a dovetail opening), it is possible to clamp the crushable elements 6 in the recesses.

Each crushable element 6 consists of a closed cylindrical steel box or tube, the cylindrical wall of which is provided with circumferential ridges or corrugations. If such a box is subjected to an axial force, it will be compressed together concertina-fashion, on account of the arrangement of the corrugations or circumferential flutings and consequently will be plastically deformed, while however the gas contained in the crushable elements 6 is compressed. In this way, energy is absorbed. Thus, if the protective strip is struck in the direction of the arrow 7 shown in the drawing, elements 6 will as a result be compressed and will absorb the impact. After impact it is a simple matter to remove the deformed crushed elements 6 from the recesses and to replace them by new ones. By choosing the right material thickness and the right kind of material for the elements 6, it is possible to obtain the desired deformation characteristic over a wide range of design requirements, so that it is also possible, by employing standard outside dimensions for the crush elements, to make these elements suitable for various different uses.

It will be clear from the above description of the invention that a large number of variations in the protective strip and the crush elements of the invention are possible. All such variations are intended to fall within the scope of the present invention and of the following claims.

What is claimed is:

1. In a protective strip for a road vehicle, comprising a metal backing element adapted to be secured to the frame of the vehicle and a shock-absorbing structure mounted on the backing element and partially surrounding said backing element so as to face outwardly from the vehicle, said structure being formed partly of plastics material, the improvement comprising incorporating in said structure at least one replaceable metal crushable element which is shaped and arranged so that it only undergoes non-resilient plastic deformation, in order to absorb energy, when said structure is compressed towards said backing element.

2. Protective strip according to claim 1 wherein said structure defines at least one recess therein shaped to readily receive and hold a replaceable crushable element.

3. Protective strip according to claim 1 wherein said crushable element has a progressive deformation characteristic when deformed in the direction towards the backing element.

4. Protective strip according to claim 1 wherein said crushable element is a generally cylindrical hollow body having circumferential corrugations.

5. Protective strip according to claim 1 wherein said crushable element is a closed hollow element and is at least partly filled with at least one of gas and solid foam.

6. Protective strip according to claim 1 wherein said structure defines a space therein in which the crushable element is embedded.

7. Protective strip according to claim 6 wherein said structure defines a plurality of spaces arranged side-by-side each of which contains a crushable element.

8. Protective strip for a road vehicle, comprising
(a) an elongate metal backing member adapted to be mounted on the frame of the vehicle so as to extend generally parallel to one of the sides and ends of the vehicle,
(b) a plastics material body mounted on and partially surrounding said metal backing member and extending outwardly with respect to the vehicle from said backing member, and having a plurality of recesses in its underside spaced from said backing member and spaced from each other in the longitudinal direction of said backing member, and
(c) a plurality of metal crushable elements respectively located in the said recesses of the plastics material body, each crushable element being a cylindrical hollow member having circumferential corrugations arranged with its axis transverse to the longitudinal direction of said elongate backing element, whereby when the strip is compressed transversely of said longitudinal direction of the backing element, only said crushable elements are adapted to undergo non-resilient plastic deformation so as to absorb energy.

9. Protective strip according to claim 8 wherein said crushable elements are sealed members and are filled with gas, which is compressed when the element undergoes axial compression.

10. Road vehicle having one or more protective strips according to claim 1 or claim 8.